(12) United States Patent
Nachenburg et al.

(10) Patent No.: US 9,189,629 B1
(45) Date of Patent: Nov. 17, 2015

(54) SYSTEMS AND METHODS FOR DISCOURAGING POLYMORPHIC MALWARE

(75) Inventors: Carey S. Nachenburg, Manhattan Beach, CA (US); Michael Spertus, Wilmette, IL (US)

(73) Assignee: Symantec Corporation, Mountain View, CA (US)

( * ) Notice: Subject to any disclaimer, the term of this patent is extended or adjusted under 35 U.S.C. 154(b) by 1373 days.

(21) Appl. No.: 12/200,679

(22) Filed: Aug. 28, 2008

(51) Int. Cl.
*G06F 11/00* (2006.01)
*G06F 21/56* (2013.01)
*G06F 21/12* (2013.01)

(52) U.S. Cl.
CPC .............. *G06F 21/565* (2013.01); *G06F 21/12* (2013.01); *G06F 21/125* (2013.01); *G06F 21/564* (2013.01)

(58) Field of Classification Search
CPC ..... G06F 21/121; G06F 21/14; G06F 21/125; G06F 21/564; G06F 21/565
USPC .............................................. 726/21; 705/52
See application file for complete search history.

(56) References Cited

U.S. PATENT DOCUMENTS

| | | | | |
|---|---|---|---|---|
| 6,658,568 | B1* | 12/2003 | Ginter et al. | 713/193 |
| 6,694,434 | B1* | 2/2004 | McGee et al. | 713/189 |
| 6,952,776 | B1* | 10/2005 | Chess | 713/188 |
| 7,369,677 | B2* | 5/2008 | Petrovic et al. | 382/100 |
| 2003/0028493 | A1* | 2/2003 | Tajima et al. | 705/67 |
| 2004/0153644 | A1* | 8/2004 | McCorkendale et al. | 713/156 |
| 2006/0167813 | A1* | 7/2006 | Aydar et al. | 705/59 |
| 2007/0094734 | A1* | 4/2007 | Mangione-Smith et al. | 726/24 |
| 2007/0203776 | A1* | 8/2007 | Austin et al. | 705/8 |
| 2007/0250920 | A1* | 10/2007 | Lindsay | 726/7 |
| 2008/0175174 | A1* | 7/2008 | Altberg et al. | 370/259 |
| 2009/0063437 | A1* | 3/2009 | Hendrey et al. | 707/4 |
| 2009/0187963 | A1* | 7/2009 | Bori | 726/1 |

OTHER PUBLICATIONS

Baker, Steven, "Network Blues", UNIX Review, v15n4, pp. 15-24.*
Leach, Norvin et al., "IE 3.0 applets will earn certification", PC Week, v13n29.*
"McAfee", http://www.mcafee.com/us/, as accessed Jun. 26, 2008, (Feb. 29, 2000).
"Windows Live OneCare", http://windows.microsoft.com/en-US/windows/security-essentials-onecare, as accessed Jun. 26, 2008, Microsoft, (On or before Jun. 26, 2008).

* cited by examiner

*Primary Examiner* — Steven Kim
(74) *Attorney, Agent, or Firm* — ALG Intellectual Property, LLC

(57) ABSTRACT

A computer-implemented method for discouraging polymorphic malware may comprise: 1) receiving a request to register a file in a registration database, 2) applying a registration tax to the file, 3) determining, based on whether the registration tax for the file has been satisfied, whether to register the file in the registration database, and then 4) determining, based at least in part on whether the file has been registered in the registration database, whether to add the file to an approved-file database. A method for determining whether to allow files on a computing device to execute using such an approved-file database is also disclosed. Corresponding systems and computer-readable media are also disclosed.

20 Claims, 8 Drawing Sheets

SYSTEMS AND METHODS FOR DISCOURAGING POLYMORPHIC MALWARE

BACKGROUND

In recent years, malicious software developers have attempted to proliferate malware by creating software that automatically generates thousands or potentially millions variations of a single malicious file (often referred to as "polymorphic malware"). There are many ways to create such obfuscating variants. For example, polymorphic malware can self-mutate or be mutated by manual or automatic processes that are not contained within the threat itself, such as by a process running on a server hosting the malware. Because many existing anti-virus technologies detect malicious files by identifying a unique digital signature or fingerprint for each variation of a malicious file, conventional anti-virus technologies have struggled to protect computing resources from polymorphic-malware threats due to their inability to quickly and correctly identify the digital signatures for each of the potentially millions of variations of a malicious file.

Such deficiencies in conventional anti-virus technologies have lead to the investigation of alternative technologies. One promising area of development is in file "whitelisting," a system in which only applications, files, or programs contained within a defined list may be accessed or executed by a computing system.

Security vendors may create whitelists either manually or automatically, such as through the use of web-spidering techniques. However, given the high number of new applications created and published on a daily basis, many security vendors have struggled with manually creating comprehensive whitelists. Moreover, many automatic techniques for creating whitelists only identify a portion of known legitimate files. Conventional automatic techniques are also prone to falsely identifying illegitimate files as legitimate, and vice-versa, further limiting the viability of a whitelist generated using such a technique.

SUMMARY

As will be described in greater detail below, the instant disclosure generally relates to systems and methods for discouraging polymorphic malware. In one embodiment, a method for discouraging polymorphic malware may comprise: 1) receiving a request to register a file, 2) requiring the originator of the request to satisfy a tax (by, for example, paying a nominal fee or solving a CAPTCHA) in order to register the file, and then 3) registering the file if the originator of the request satisfies the tax. In one example, the system may register a file by storing a digital signature (such as hash or checksum) for the file in a registration database maintained by a security vendor.

In certain embodiments, the system may tentatively regard the registered file as legitimate and add the file to an approved-file database (which may represent, or serve as the basis for generating, a whitelist or a greylist) maintained by a security vendor. In an additional embodiment, the system may only add the registered file to the approved-file database upon verifying the legitimacy of the file. The system may attempt to verify the legitimacy of the file in a variety of ways, such as by executing the file within a virtual environment or by determining whether a digital signature for the file matches a digital signature for a file that is known to be malicious.

As detailed above, the systems and methods described herein may also enable a computing device to determine whether to allow files to execute by examining a whitelist or greylist created using the principles detailed above. In this example, a method for determining whether to allow files to execute on a computing device may comprise: 1) identifying a file, 2) determining whether the file is on a whitelist or a greylist that contains files that have satisfied a registration tax (such as the nominal fee or CAPTCHA described above), and then 3) only allowing the file to execute on the computing device if the file is on the whitelist or greylist.

Systems and computer-readable media corresponding to the above-described methods are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
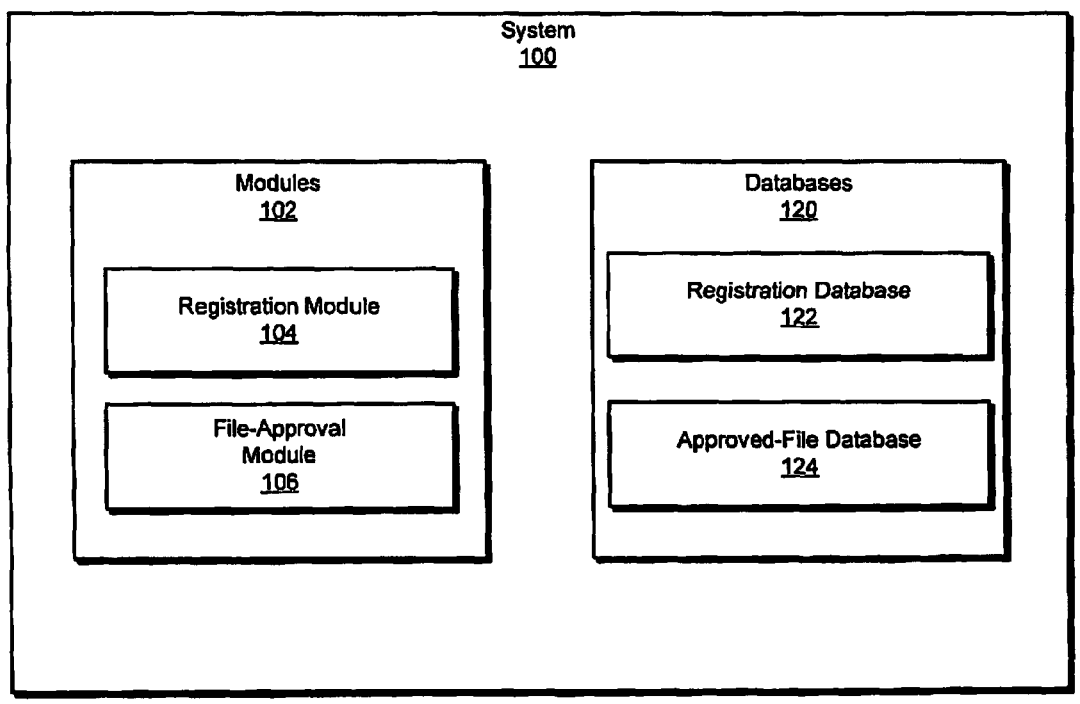
FIG. 1 is a block diagram of an exemplary system for discouraging polymorphic malware according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for discouraging polymorphic malware. The following will provide, with reference to FIGS. 1 and 2, detailed descriptions of exemplary systems for discouraging polymorphic malware. A detailed description of corresponding exemplary computer-implemented methods will also be provided in connection with FIGS. 3 and 6. In addition, a description of an exemplary user interface for prompting a developer of a file to satisfy a registration tax (by, for example, paying a nominal fee or by answering a CAPTCHA) will be provided in connection with FIG. 4. A description of an exemplary CAPTCHA that may be presented to a developer of a file will also be provided in connection with FIG. 5.

FIG. 1 is a block diagram of an exemplary system 100 for discouraging polymorphic malware. As illustrated in this figure, exemplary system 100 may comprise one or more modules 102 for performing one or more tasks. For example, exemplary system 100 may comprise a registration module 104 for determining whether to register files submitted by software developers. Exemplary system 100 may also comprise a file-approval module 106 for determining whether to add registered files to an approved-file database (which, as described below, may represent, or serve as the basis for generating, a whitelist or a greylist). Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks required to discourage polymorphic malware. For example, as will be described in greater detail below, one or more of modules 102 may represent software modules configured to run on one or more computing devices, such as the devices illustrated in FIG. 2 (e.g., client 202 and/or server 206), computing system 710 in FIG. 7, and/or portions of exemplary network architecture 800 in FIG. 8. One or more modules 102 in FIG. 1 may also represent all or portions of one or more special-purpose computers configured to perform one or more tasks required to discourage polymorphic malware.

As illustrated in FIG. 1, exemplary system 100 may also comprise one or more databases 120. Databases 120 may represent portions of a single database or computing device or a plurality of databases or computing devices. In one embodiment, exemplary system 100 may comprise a registration database 122 maintained by a security vendor for storing files (or digital signatures of files, such as hashes or checksums) that have been registered by registration module 104.

Exemplary system 100 may also comprise an approved-file database 124 maintained by a security vendor for storing files (or digital signatures of files) that have been approved by file-approval module 106. As detailed above, approved-file database 124 may represent, or may be used to generate, a whitelist or a greylist.

One or more of databases 120 in FIG. 1 may represent a portion of one or more computing devices. For example, one or more of databases 120 may represent a portion of one or more of the devices in FIG. 2, computing system 710 in FIG. 7, and/or portions of exemplary network architecture 800 in FIG. 8. Alternatively, one or more of databases 120 in FIG. 1 may represent one or more physically separate devices capable of being accessed by a computing device, such as the devices in FIG. 2, computing system 710 in FIG. 7, and/or portions of exemplary network architecture 800 in FIG. 8.

Figure 2:
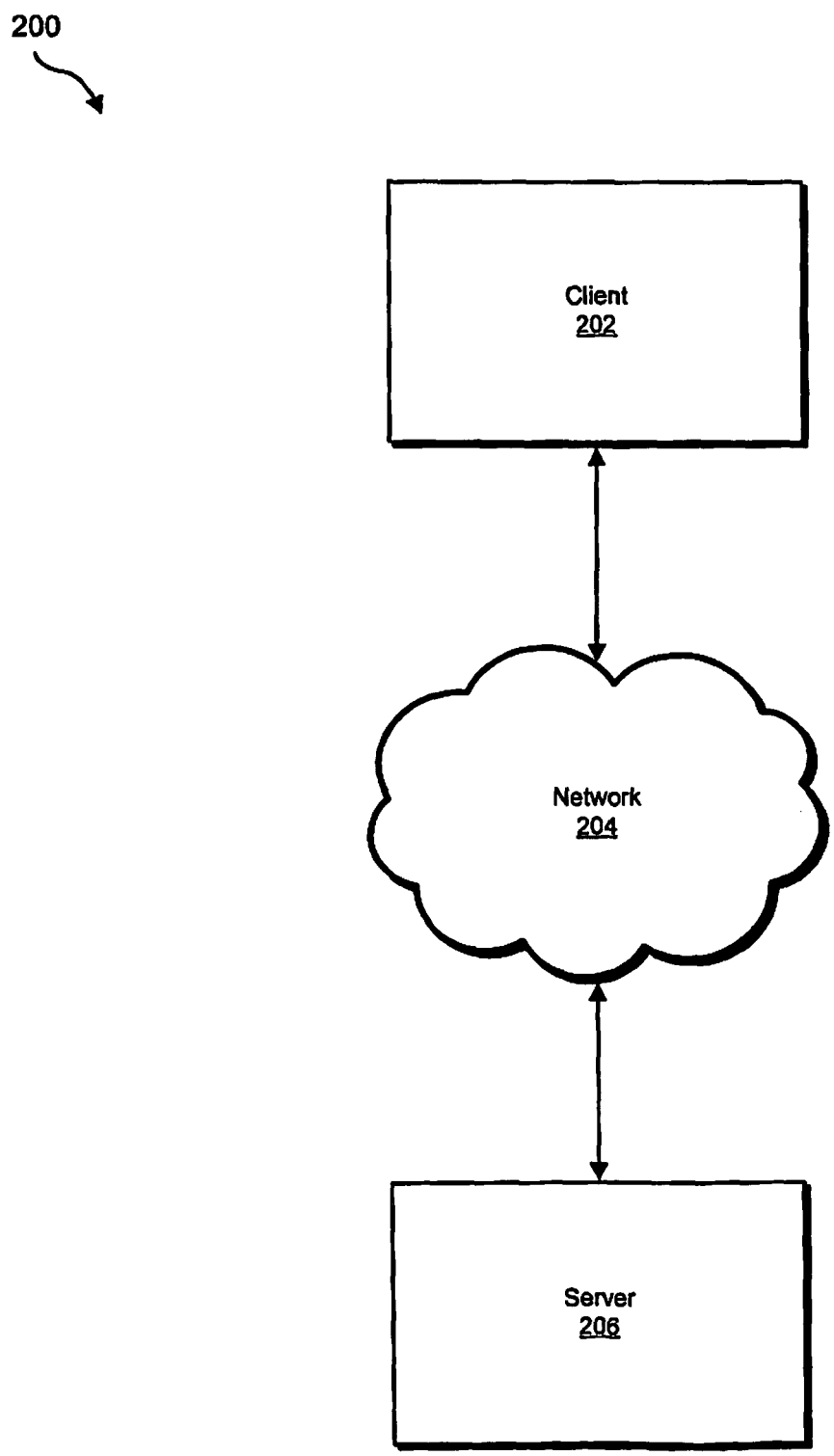
FIG. 2 is a block diagram of an exemplary system for discouraging polymorphic malware according to an additional embodiment.

Exemplary system 100 in FIG. 1 may be deployed in a variety of ways. In one example, system 100 may be deployed within a networked system. FIG. 2 is a block diagram of an exemplary networked system 200 in which system 100 in FIG. 1 may be deployed. As illustrated in this figure, exemplary system 200 may comprise a client 202 in communication with a server 206 via a network 204. In at least one embodiment, a developer or creator of a file may cause client 202 to transmit (via network 204) a request to server 206 (which may be maintained by a security vendor) to register a file with the security vendor.

Client 202 in FIG. 2 generally represents any type or form of client-side computing device capable of executing computer-readable instructions. In certain embodiments, client 202 may comprise one or more portions of exemplary system 100 in FIG. 1. For example, one or more of modules 102 from FIG. 1 may be stored or configured to run on client 202 in FIG. 2. Similarly, client 202 may comprise one or more of databases 120 in FIG. 1.

Network 204 generally represents any type or form of communication or computing network; including, for example, an intranet, a wide area network (WAN), a local area network (LAN), a personal area network (PAN), or the Internet.

As illustrated in FIG. 2, exemplary system 200 may also comprise a server 206. Server 206 generally represents any type or form of computing device. In certain embodiments, server 206 may comprise one or more portions of exemplary system 100 in FIG. 1. For example, one or more of modules 102 from FIG. 1 may be stored or configured to run on server 206 in FIG. 2. Similarly, server 206 may comprise one or more of databases 120 in FIG. 1. In one embodiment, a security vendor may maintain server 206.

Figure 3:
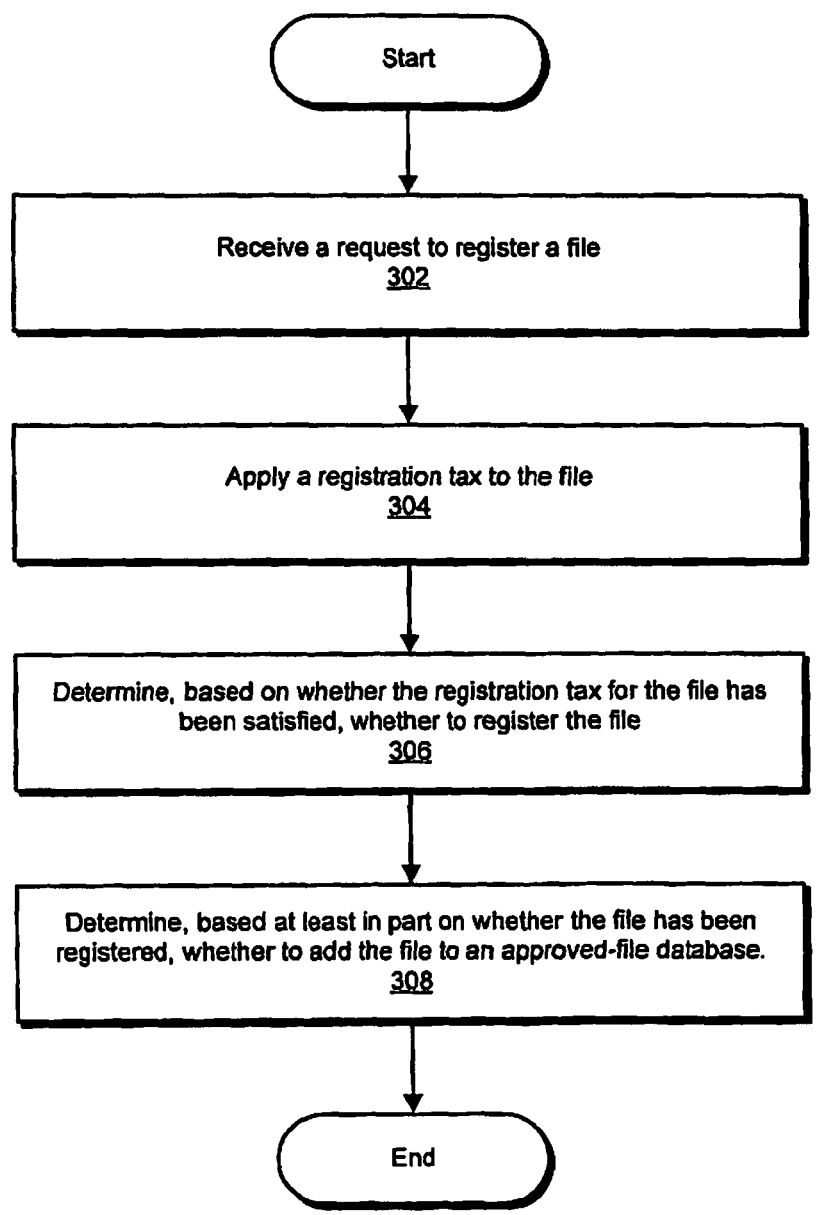
FIG. 3 is a flow diagram of an exemplary computer-implemented method for discouraging polymorphic malware according to at least one embodiment.

FIG. 3 is a flow diagram of an exemplary computer-implemented method 300 for discouraging polymorphic malware. As illustrated in this figure, at step 302 a request to register a file may be received. For example, registration module 104 in FIG. 1 stored on server 206 in FIG. 2 (which may, as detailed above, be maintained by a security vendor) may receive a request from a software developer via client 202 in FIG. 2 to register a file in registration database 122 in FIG. 1. As used herein, the term "file" may refer to any block of information or resource for storing computer-readable information. Examples of files include, without limitation, executables, installation packages, emails, or any other file.

Step 302 may be performed in a variety of ways. In one embodiment, the request received in step 302 may contain a copy of the file itself and/or a digital signature (such as a hash or checksum) for the file. If the request received in step 302 only contains a copy of the file itself, then registration module 104 may generate a digital signature for the file.

At step 304, the system may apply a registration tax to the file. For example, registration module 104 in FIG. 1 may require that the originator of the request received in step 302 (e.g., the developer or creator of the file) satisfy a registration tax in order to register the file. As used herein, the phrase "registration tax" may refer to any barrier or hurdle, however trivial, which must be satisfied prior to registering a file. Step 304 may be performed in a variety of ways. In one embodiment, step 304 may comprise requiring the developer or creator of a file to pay a nominal fee in order to register the file. For example, registration module 102 in FIG. 1 loaded on server 206 in FIG. 2 may, upon receiving a request to register a file in step 302, transmit a request to client 202 requesting payment of a nominal fee (such as $1) in order to register the file in registration database 122.

In an additional embodiment, step 304 may comprise administering a human-verification test. As used herein, the phrase "human-verification test" generally refers to any type or form of test used to verify that a human is operating a computing device. Examples of human-verification tests include, without limitation, Turing tests (such as a CAPTCHA test) or any other suitable human-verification test. For example, registration module 104 in FIG. 1 may, upon receiving a request to register a file in step 302, require the developer or creator of the file to complete a CAPTCHA, to call a toll-free telephone number maintained by a security vendor, to send a letter to the security vendor, or the like.

In certain embodiments, the tax levied may vary depending on the nature of the submitted file. For example, if a suspicious-looking file (e.g., a file that appears to be packed or obfuscated) is submitted for registration, then registration module 104 may increase the tax required to register such a file to discourage the developer of the file from registering the same since it has a higher probability of being malicious. Similarly, registration module 104 may reduce the tax required to register files that have positive attributes. Examples of files having such positive attributes include, without limitation, files that are digitally signed with a class-3 certificate issued by a reputable certificate authority vouching for its legitimacy, files that are clearly not obfuscated in any way, files that have vendor information embedded in them that match the registered identity of the software provider, or files that are substantially similar to files that have been previously submitted by the same submitter.

Similarly, registration module 104 may vary a registration tax depending on the degree to which the submitter's identity has been verified and/or corroborated via trustworthy sources. In another embodiment, at the time of submission, the submitter may alternatively specify a publicly available URL or FTP site, hosted within the domain of the software vendor, that serves the file(s) in question, thus allowing the security vendor to explicitly confirm that the software is published by the registered vendor. Registration module 104 may also adjust a registration tax based on the period of time the developer or publisher has been signed up and in good standing with the registration service or based on the developer's volume of submissions to the registration service.

Figure 4:
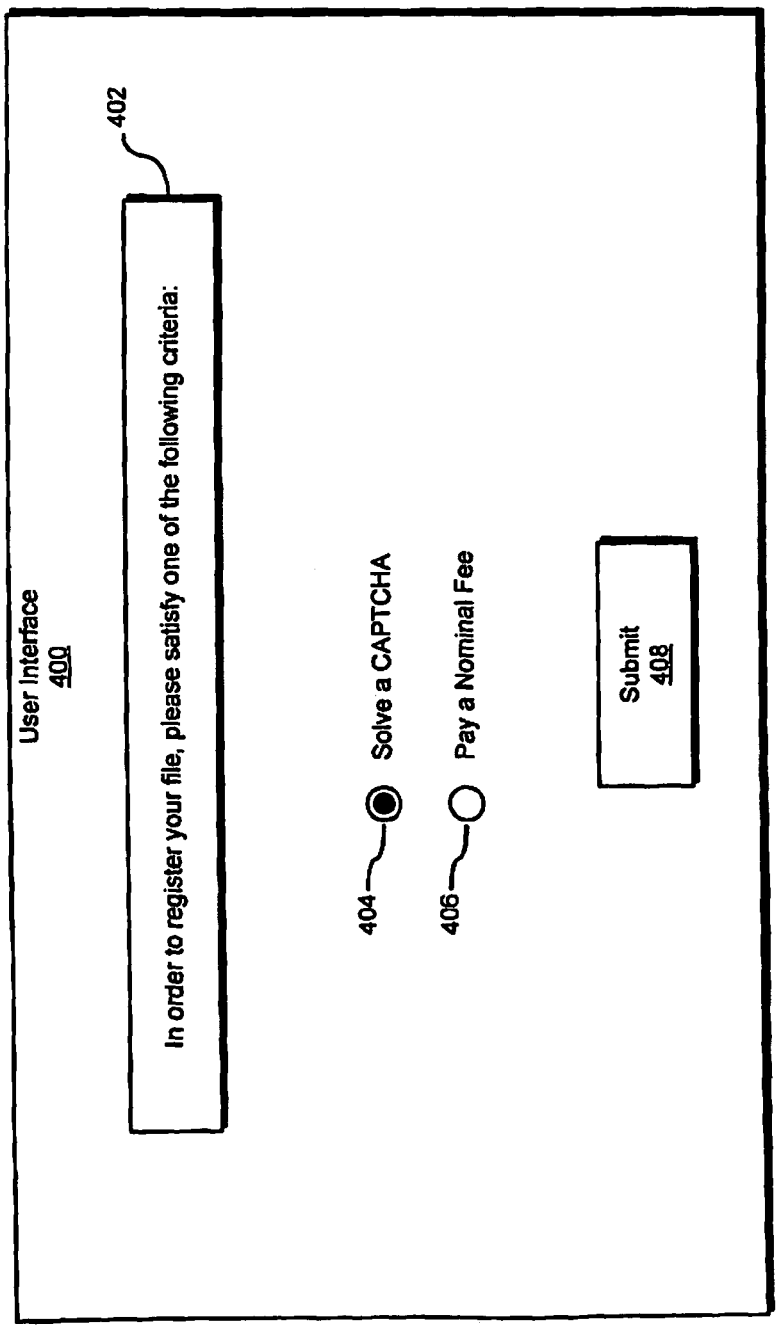
FIG. 4 is a block diagram of an exemplary user interface for prompting a developer of a file to satisfy a registration tax according to at least one embodiment.

FIG. 4 is an illustration of an exemplary user interface 400 for prompting a developer of a file to satisfy a registration tax. As illustrated in this figure, user interface 400 may comprise an explanatory text box 402 for prompting a developer or creator of a file to: 1) solve a human-verification test (by selecting user-selectable object 404), 2) pay a nominal fee (by selecting user-selectable object 406), and/or 3) satisfy any other suitable registration tax in order to register the file. Upon selecting one of user-selectable objects 404 and 406, the developer may select user-selectable object 408, after which the user may be prompted to solve a human-verification test or pay a nominal fee.

Figure 5:
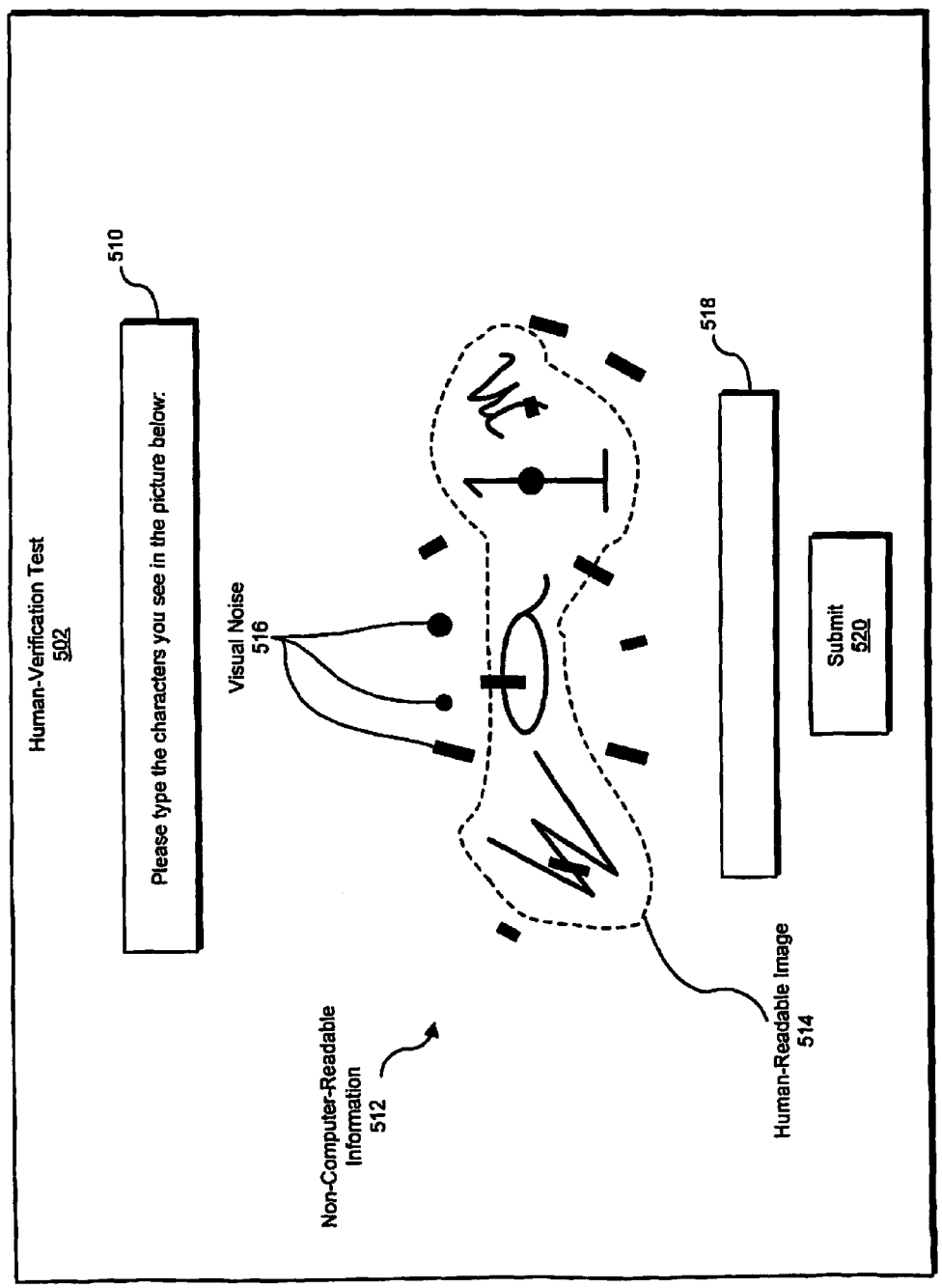
FIG. 5 is a block diagram of an exemplary human-verification test according to one embodiment.

FIG. 5 is an illustration of an exemplary human-verification test 502 that registration module 104 may require a developer or creator of a file to solve prior to registering the file. As illustrated in this figure, human-verification test 502 may comprise an explanatory text box 510 for prompting a user to identify a human-readable image 514 from within non-computer-readable information 512 and enter the same within a user-input box 518. The phrase "non-computer-readable information," as used herein, generally refers to information that may not be comprehended or processed by a computing device or software application. In certain examples, non-computer-readable information 512 may contain images or questions that may not be processed or comprehended by a computer. For example, as illustrated in FIG. 5, non-computer-readable information 512 may contain a human-readable image 514 ("Walm") that is in a format that prevents a computing device or a software application from extracting useful information. Alternatively, non-computer-readable information 512 may contain a relatively simple question that may be easily answered by a human, such as "What color is the sky?" or "What is 3×2?"

Human-readable image 514 in FIG. 5 generally represents any type or form of image that may be read or comprehended by a human. Examples of human-readable image 514 include, without limitation, bitmaps, jpegs, tiffs, or any other image format. In certain embodiments, human-readable image 514 may display information in a human-readable format that is unreadable by a computing device or software application.

In certain embodiments, non-computer-readable information 512 may comprise visual noise 516. As used herein, the phrase "visual noise" generally refers to information added to non-computer-readable information 512 in order to prevent a computing device or software program from extracting useful information. Examples of visual noise include, without limitation, various shapes and objects (such as lines, dashes, dots, or the like), background colors or patterns, or any other type of visual information that may be used to prevent a computing device or software program from extracting useful information from non-computer-readable information 512.

In at least one embodiment, human-readable image 514 may be created by transforming at least a portion of computer-readable text (such as the text "Walm"). Human-readable images may be transformed in a variety of ways. For example, in certain embodiments transforming at least a portion of a human-readable image may comprise rotating at least a portion of the human-readable image, stretching at least a portion of the human-readable image, and/or tilting at least a portion of the human-readable image.

In the example illustrated in FIG. 5, a user may complete human-verification test 502 by identifying human-readable image 514 from within non-computer-readable information 512, entering the same as text within user-input box 518, and then selecting user-selectable object 520. Registration module 104 may then determine whether the answer supplied is correct.

Returning to FIG. 3, at step 306 the system may: 1) determine whether the registration tax from step 304 has been satisfied and then 2) determine, based on whether the registration tax for the file has been satisfied, whether to register the file. For example, registration module 104 in FIG. 1 may determine whether the originator of the request received in step 302 has paid the nominal fee requested in step 304 and/or correctly answered the CAPTCHA administered in step 304.

If registration module 104 determines that the registration tax for the file has been satisfied, then registration module 104 may register the file in registration database 122. Registration module 104 may register files in registration database 122 in a variety of ways. In one example, registration module 104 may store a digital signature (such as a checksum or hash) for the file in registration database 122.

At step 308, the system may determine, based at least in part on whether the file has been registered in the registration database, whether to add the file to an approved-file database. For example, file-approval module 106 in FIG. 1 may determine whether registration module 104 added the file to registration database 122 in step 306. In one embodiment, if file-approval module 106 determines that registration module 104 added the file to registration database 122, then file-approval module 106 may immediately add the file to approved-file database 124.

However, in an additional embodiment, file-approval module 106 may, upon determining that registration module 104 has added the file to registration database 122, attempt to verify the legitimacy of the file prior to adding the file to approved-file database 124. If file-approval module 106 is able to verify the legitimacy of the file, then file-approval module 106 may add the file to approved-file database 124. Alternatively, if file-approval module 106 is unable to verify the legitimacy of the file, then file-approval module 106 may not add the file to approved-file database 124.

File-approval module 106 may attempt to verify the legitimacy of files in a variety of ways. For example, file-approval module 106 may: 1) determine whether a digital signature for the file matches a digital signature for a known malicious file, 2) execute the file within a virtual or emulated computing environment to determine whether the file contains malicious payload, or 3) verify the legitimacy of the file through any other suitable means. Upon completion of step 308, exemplary method 300 in FIG. 3 may terminate.

As explained above, approved-file database 124 in FIG. 1 may represent, or may be used to generate, a whitelist or a greylist. In certain embodiments, a security vendor may deploy such a whitelist or greylist to users of the security vendor's software. These users may then use the whitelist or greylist to prevent any files not on the whitelist or greylist from running or executing, thereby reducing the possibility of executing a malicious file.

As detailed above, the registration tax applied in step 304 of exemplary method 300 in FIG. 3 may represent a significant burden or barrier to registration for developers or creators of polymorphic malware, while simultaneously representing a trivial burden to developers of legitimate files. For example, because developers of files must satisfy a registration tax for each variation of a file, developers of polymorphic malware may be discouraged from registering each version (which may total in the thousands or even millions) of their malware.

Moreover, even if a malicious programmer intentionally registers a small number of variations of a malicious file in registration database 124, registration database 124 still serves as a "honeypot" and a disincentive for malicious programmers to develop polymorphic malware. Moreover, because the registration tax required to register a file in registration database 124 may likely reduce the number of registered variations of a threat, the ability of a security vendor to quickly and correctly identify each of these variations may be greatly increased. Finally, because a security vendor may attempt to verify the legitimacy of each file registered in registration database 122 prior to adding the same to approved-file database 124, the security vendor may be able to prevent malicious files from being added to a whitelist or greylist created based on approved-file database 124.

Figure 6:
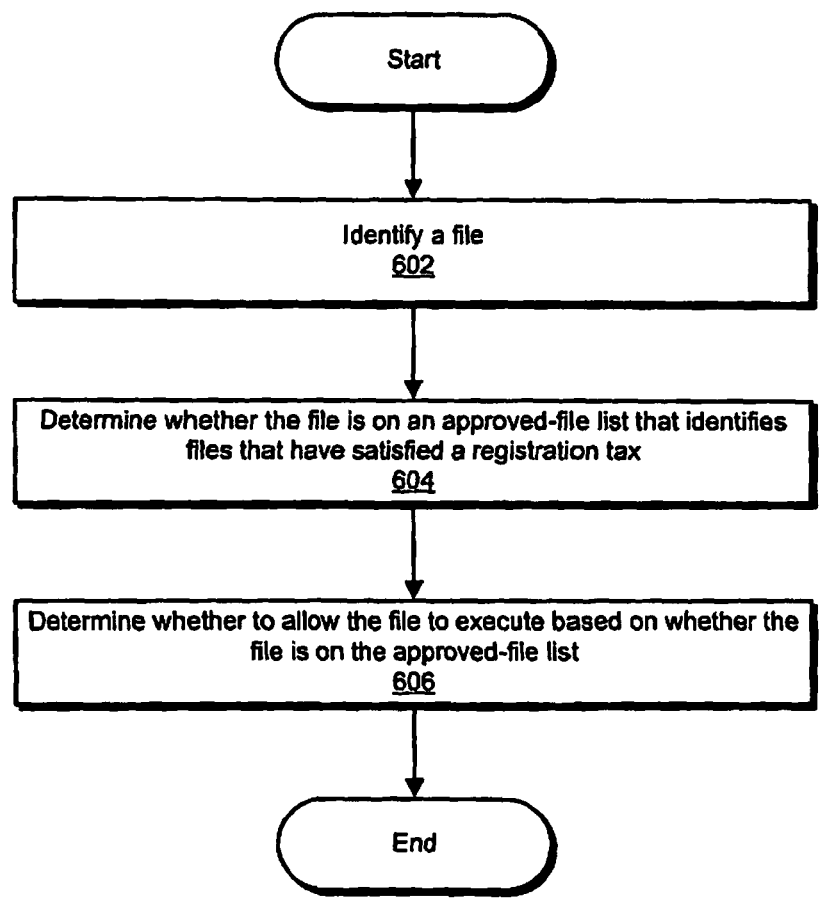
FIG. 6 is a flow diagram of an exemplary computer-implemented method for determining whether to allow files on a computing device to execute according to at least one embodiment.

As detailed above, the systems and methods described herein may also enable a computing device to determine whether to allow files to execute by examining a whitelist or greylist created using the principles detailed above. FIG. 6 is a flow diagram of an exemplary computer-implemented method 600 for determining whether to allow files on a computing to execute. As illustrated in this figure, at step 602 the system may identify a file. For example, registration module 104 in FIG. 1 stored on client 202 in FIG. 2 may identify a file downloaded or loaded onto client 202.

At step 604, the system may determine whether the file identified in step 602 is on an approved-file list (such as a whitelist or greylist provided by a security vendor). For example, file-approval module 106 may determine whether a digital signature (such as a checksum or hash) for the file identified in step 302 is contained within approved-file database 124. As detailed above, approved-file database 124 may identify files that have, at the very least, been registered with a security vendor, such as through payment of a nominal fee or through completion of a CAPTCHA test. In certain embodiments, approved-file database 124 may also identify files that a security vendor has verified to be legitimate, as detailed above. In one example, users of a security vendor's software may be able to choose whether to include self-registered files (such as the files identified in registration database 122) in any whitelist or greylist used by the user.

Step 604 may be performed in a variety of ways. For example, in embodiments where file-approval module 106 in FIG. 1 is stored on client 202 in FIG. 2, file-approval module 106 may determine whether the file identified in step 602 is on an approved-file list (such as a whitelist or greylist) maintained by a security vendor by: 1) identifying an approved-file list stored locally on client 202, 2) receiving a remotely stored approved-file list from a remote computing device (such as from server 206 in FIG. 2, which may be maintained by a security vendor), and/or 3) transmitting a request to a remote computing device (such as server 206) asking that the remote computing device determine whether the file is on an approved-file list.

At step 606, the system may determine whether to allow the file to execute based on whether the file is on the approved-file list. For example, file-approval module 106 in FIG. 1 may allow the file identified in step 602 to execute on the computing device if file-approval module 106 determines that a digital signature for the file is contained within approved-file database 124. Alternatively, file-approval module 106 may prevent the file from executing if a digital signature for the file is not contained within approved-file database 124. Upon completion of step 606, exemplary method 600 in FIG. 6 may terminate.

Figure 7:
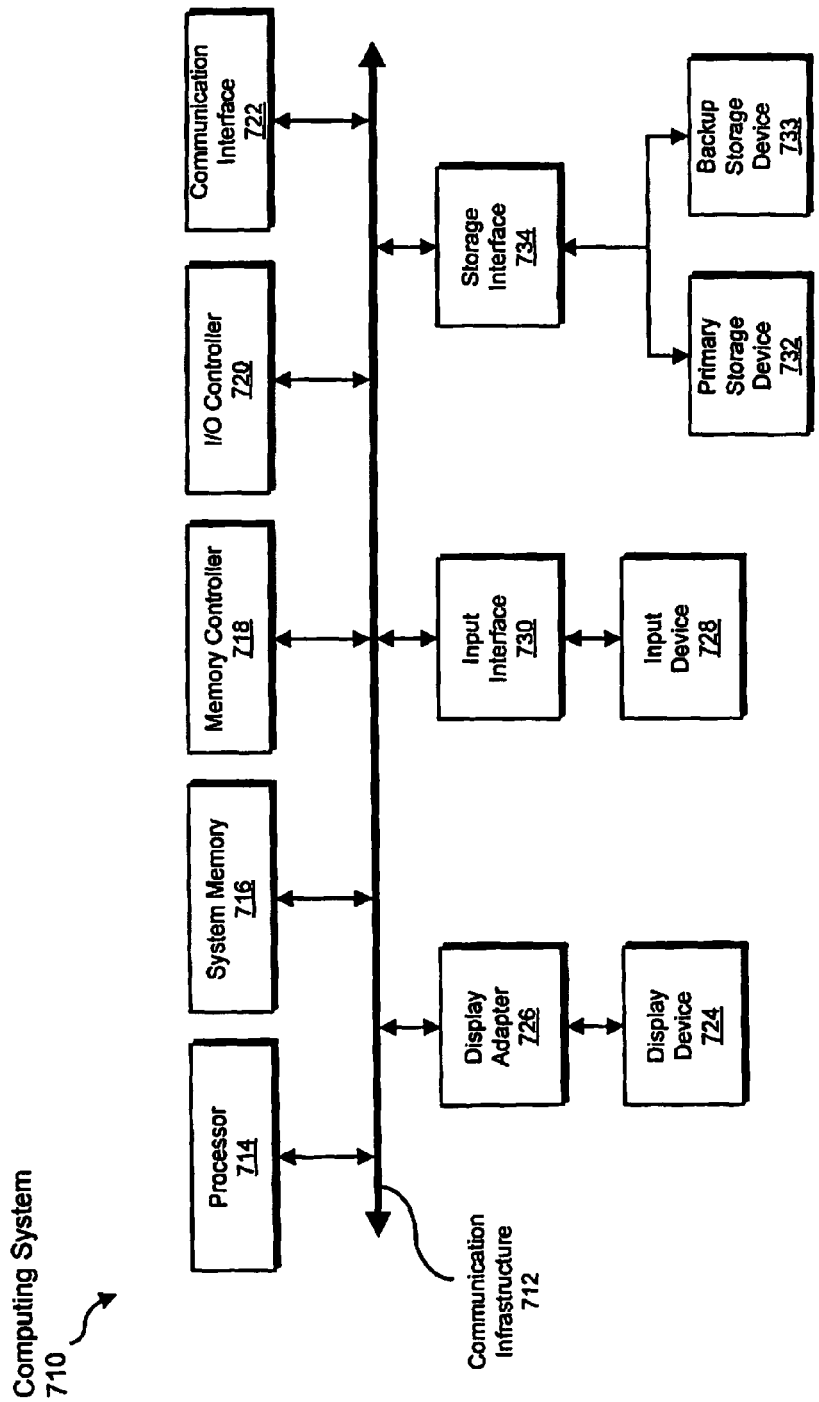
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, applying, determining, requesting, administering, attempting, executing, generating, identifying, and transmitting steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as receiving, applying, determining, requesting, administering, attempting, executing, generating, identifying, and/or transmitting.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the receiving, applying, determining, requesting, administering, attempting, executing, generating, identifying, and transmitting steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 794 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, applying, determining, requesting, administering, attempting, executing, generating, identifying, and transmitting steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, applying, determining, requesting, administering, attempting, executing, generating, identifying, and transmitting steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the receiving, applying, determining, requesting, administering, attempting, executing, generating, identifying, and transmitting steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
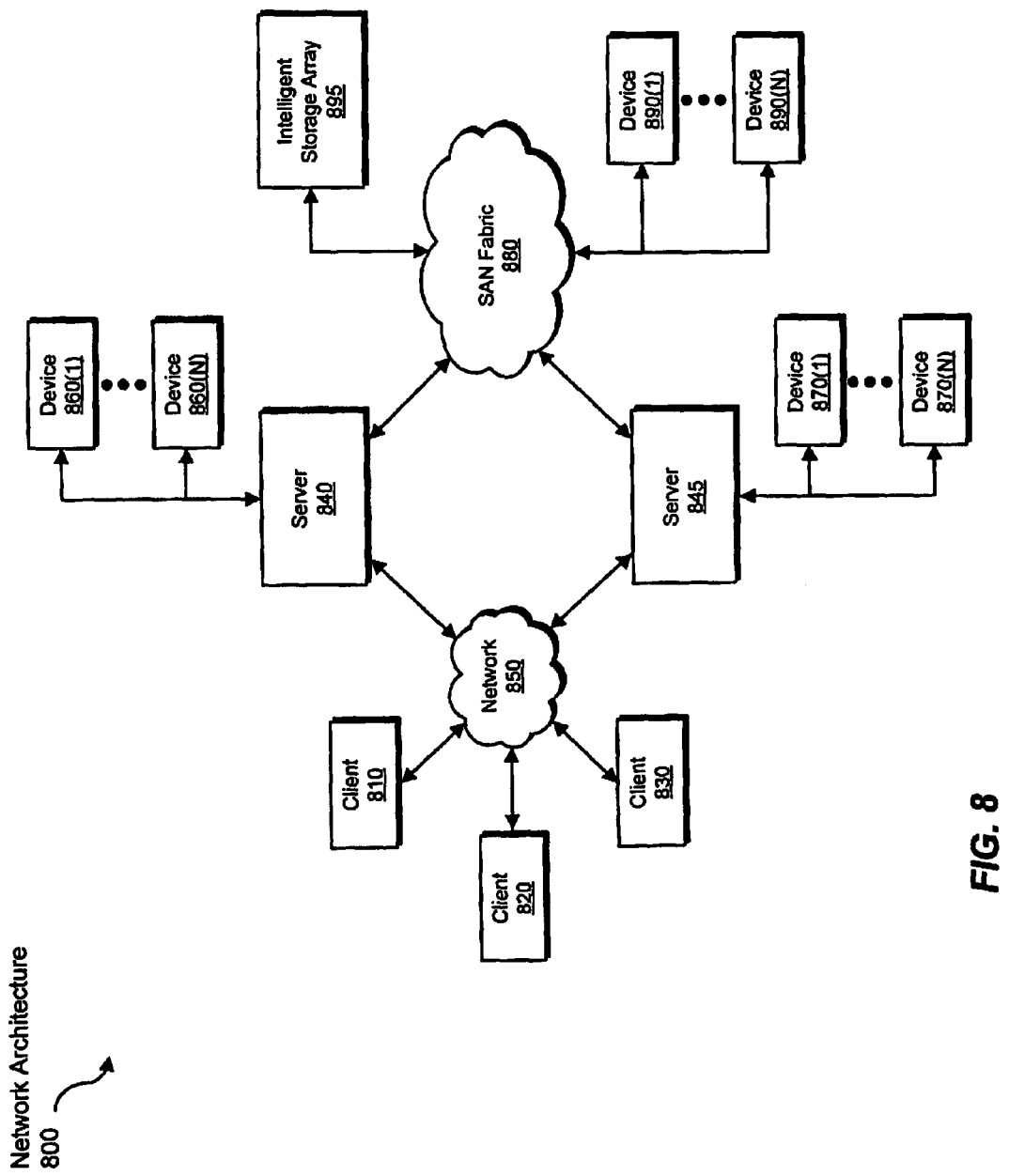
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, applying, determining, requesting, administering, attempting, executing, generating, identifying, and transmitting steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. For example, a computer-implemented method for discouraging polymorphic malware may comprise: 1) receiving a request to register a file in a registration database, 2) applying a registration tax to the file, 3) determining, based on whether the registration tax for the file has been satisfied, whether to register the file in the registration database, and then 4) determining, based at least in part on whether the file has been registered in the registration database, whether to add the file to an approved-file database.

In certain embodiments, applying the registration tax to the file may comprise requesting payment of a nominal fee or administering a human-verification test. The human-verification test may comprise a CAPTCHA. In one embodiment, applying the registration tax to the file may comprise adjusting the registration tax based on at least one characteristic of the file and/or at least one characteristic of a developer of the file.

Furthermore, determining whether to add the file to the approved-filed database may comprise attempting to verify the legitimacy of the file. The approved-file database may comprise a whitelist or a greylist. To attempt to verify the legitimacy of the file, the method may comprise determining whether a digital signature for the file matches the digital signature for a known malicious file or executing the file within a virtual environment.

When receiving the request to register the file, the method may comprise receiving a digital signature for the file and/or receiving the file. The method may further comprise generating a digital signature for the file, which may be stored in either the registration database or the approved-file database. In at least one embodiment, the method may also comprise receiving a request to register a variation of the file in the registration database, applying the registration tax, and then determining whether to register the variation of the file in the registration database.

A computer-implemented method for determining whether to allow files on a computing device to execute may comprise: 1) identifying a file, 2) determining whether the file is on an approved-file list, wherein the approved-file list identifies files that have satisfied a registration tax, and then 3) determining whether to allow the file to execute based on whether the file is on the approved-file list. The registration tax may comprise a nominal fee or a human-verification test.

In some embodiments, each file identified on the approved-file list may have been verified as legitimate. To determine whether the file is on the approved-file list, the method may comprise identifying a locally stored approved-file list, receiving a remotely stored approved-file list, or transmitting a request to a remote computing device to determine whether the file is on the remotely stored approved-file list. In one embodiment, identifying the file may comprise generating a digital signature for the file.

In additional embodiments, the method may further comprise: 1) identifying a variation of the file, 2) determining whether the variation of the file is on the approved-file list, and then 3) determining whether to allow the variation of the file to execute based on whether the variation of the file is on approved-file list. The approved-file list may comprise a whitelist or a greylist.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for discouraging polymorphic malware, the method comprising:
   receiving a request to register a file in a registration database, the request comprising the file;
   prompting a user to select between solving a human-verification test and payment of a specified fee in order to register the file by:
      simultaneously displaying both a graphical option for the user to solve the human-verification test and a graphical option for the user to pay the specified fee;
      prompting the user to select one of the two simultaneously displayed graphical options in order to register the file;
   receiving a selection from the user between solving the human-verification test and payment of the specified fee;
   applying a registration tax to the file in accordance with the user's selection;
   determining based on whether the registration tax for the file has been satisfied in accordance with the user's selection, whether to register the file in the registration database;
   verifying legitimacy of the file by at least one of:
      determining whether a digital signature of the file matches a digital signature of a known malicious file;

determining whether the file contains a malicious payload by executing the file within a virtual computing environment;

determining, based at least in part on whether the file has been registered in the registration database and the verifying legitimacy of the file, whether to add the file to an approved-file database;

adding the file to the approved-file database in accordance with the determining; and transmitting information to a client device to enable the client device to check whether a digital signature of a candidate file at the client device matches the digital signature of the file added to the approved-file database, the transmitted information comprising at least one of:

an approved-file list based at least in part on the approved-file database;

an indication of whether the digital signature of the candidate file at the client device matches the digital signature of the file added to the approved-file database based on a comparison performed at a server device;

wherein the server device performs the method.

2. The method of claim 1, wherein applying the registration tax to the file further comprises administering the human-verification test.

3. The method of claim 1, further comprising:
determining that the file has a positive attribute;
reducing the registration tax required to register the file based on the determination that the file has the positive attribute.

4. The method of claim 3, wherein the positive attribute comprises at least one of:
a digital signature with a class-3 certificate issued by a certificate authority vouching that the file is legitimate;
absence of obfuscation;
embedded vendor information that matches a registered identity of a provider that provides the file.

5. The method of claim 1, wherein prompting the user to select one of the two simultaneously displayed graphical options comprises prompting the user to select one of the two simultaneously displayed graphical options using a radio button.

6. The method of claim 1, wherein the specified fee is less than or equal to one dollar.

7. The method of claim 1, further comprising increasing the registration tax required to register the file based on a determination that the file is suspicious.

8. The method of claim 7, wherein the file is determined to be suspicious based on the file being determined to be at least one of packed and obfuscated.

9. The method of claim 1, further comprising altering the registration tax based on a degree to which an identity of a submitter that submitted the file has been verified via a trustworthy source.

10. The method of claim 1, further comprising adjusting the registration tax based on at least one of:
a period of time a developer of the file has been certified by a registration service to which the file was submitted;
a volume of submissions by the developer to the registration service.

11. A system for discouraging polymorphic malware, the system comprising a server device that further comprises:
a server comprising:
at least one physical processor; and
a memory storing a registration module programmed to perform the following through the at least one physical processor:

identify a request to register a file in a registration database, the request comprising the file;

prompt a user to select between solving a human-verification test and payment of a specified fee in order to register the file by:
simultaneously displaying both a graphical option for the user to solve the human-verification test and a graphical option for the user to pay the specified fee;
prompting the user to select one of the two simultaneously displayed graphical options in order to register the file;

receive a selection from the user between solving the human verification test and payment of the specified fee;

apply a registration tax to the file in accordance with the user's selection;

determine, based on whether the registration tax for the file has been satisfied in accordance with the user's selection, whether to register the file in the registration database;

wherein the memory further stores a file-approval module programmed to perform the following through the at least one physical processor:
verify legitimacy of the file by at least one of:
determining whether a digital signature of the file matches a digital signature of a known malicious file;
determining whether the file contains a malicious payload by executing the file within a virtual computing environment;

determine, based at least in part on whether the file has been registered in the registration database and the verifying legitimacy of the file, whether to add the file to an approved-file data base;

add the file to the approved-file database in accordance with the determining; and transmit information to a client device to enable the client device to check whether a digital signature of a candidate file at the client device matches the digital signature of the file added to the approved-file database, the transmitted information comprising at least one of:
an approved-file list based at least in part on the approved-file database;
an indication of whether the digital signature of the candidate file at the client device matches the digital signature of the file added to the approved-file database based on a comparison performed at the server device.

12. The system of claim 11, wherein the registration module is programmed to apply the registration tax to the file by administering the human-verification test.

13. The system of claim 11, wherein the registration module is programmed to alter the registration tax based on a degree to which an identity of a submitter that submitted the file has been verified via a trustworthy source.

14. The system of claim 11, wherein the registration module is further programmed to adjust the registration tax based on at least one of:
at least one characteristic of the file; and
at least one characteristic of a developer of the file.

15. A non-transitory computer-readable medium comprising one or more computer-readable instructions that, when executed by at least one processor of a server device, cause the server device to:

receive a request to register a file in a registration database, the request comprising the file;
prompt a user to select between solving a human-verification test and payment of a specified fee in order to register the file by:
  simultaneously displaying both a graphical option for the user to solve the human-verification test and a graphical option for the user to pay the specified fee;
  prompting the user to select one of the two simultaneously displayed graphical options in order to register the file;
receive a selection from the user between solving the human-verification test and payment of the specified fee;
apply a registration tax to the file in accordance with the user's selection;
determine based on whether the registration tax for the file has been satisfied in accordance with the user's selection, whether to register the file in the registration database;
verify legitimacy of the file by at least one of:
  determining whether a digital signature for the file matches a digital signature for a known malicious file;
  determining whether the file contains a malicious payload by executing the file within a virtual computing environment;
determine, based at least in part on whether the file has been registered in the registration database and the verifying legitimacy of the file, whether to add the file to an approved-file database;
add the file to the approved-file database in accordance with the determining; and
transmit information to a client device to enable the client device to check whether a digital signature of a candidate file at the client device matches the digital signature of the file added to the approved-file database, the transmitted information comprising at least one of:
  an approved-file list based at least in part on the approved-file database;
  an indication of whether the digital signature of the candidate file at the client device matches the digital signature of the file added to the approved-file database based on a comparison performed at the server device.

16. The non-transitory computer-readable medium of claim 15, wherein applying the registration tax to the file further comprises administering the human-verification test.

17. The non-transitory computer-readable medium of claim 15, wherein prompting the user to select one of the two simultaneously displayed graphical options comprises prompting the user to select one of the two simultaneously displayed graphical options using a radio button.

18. The non-transitory computer-readable medium of claim 15, wherein the instructions further cause the server device to alter the registration tax based on a degree to which an identity of a submitter that submitted the file has been verified via a trustworthy source.

19. The non-transitory computer-readable medium of claim 15, wherein the instructions further cause the server device to adjust the registration tax based on at least one of:
  a period of time a developer of the file has been certified by a registration service to which the file was submitted;
  a volume of submissions by the developer to the registration service.

20. The non-transitory computer-readable medium of claim 15, wherein the instructions further cause the server device to increase the registration tax required to register the file based on a determination that the file is suspicious.

\* \* \* \* \*